US009600102B2

(12) United States Patent
Lee et al.

(10) Patent No.: US 9,600,102 B2
(45) Date of Patent: Mar. 21, 2017

(54) GLASS PLATE, METHOD FOR MANUFACTURING THE SAME, AND DISPLAY DEVICE, TOUCH SENSITIVE DISPLAY USING THE SAME

(75) Inventors: Yuh-Wen Lee, Zhubei (TW); Qiong Yuan, Xinyu (CN); Xianbin Xu, Xiamen (CN)

(73) Assignee: TPK Touch Solutions (XIAMEN) Inc., Xiamen (CN)

( * ) Notice: Subject to any disclaimer, the term of this patent is extended or adjusted under 35 U.S.C. 154(b) by 889 days.

(21) Appl. No.: 13/186,487

(22) Filed: Jul. 20, 2011

(65) Prior Publication Data
US 2012/0135247 A1   May 31, 2012

(30) Foreign Application Priority Data

Nov. 28, 2010 (CN) .......................... 2010 1 0578960

(51) Int. Cl.
*G06F 3/041* (2006.01)
*G02F 1/01* (2006.01)
*G02F 1/1339* (2006.01)

(52) U.S. Cl.
CPC ............ *G06F 3/041* (2013.01); *G02F 1/0107* (2013.01); *G02F 1/1339* (2013.01); *G06F 3/0412* (2013.01)

(58) Field of Classification Search
CPC ....... C03C 17/32; C03C 17/326; G06F 3/041; G06F 3/0412; G02F 1/0107; G02F 1/1339
USPC ..................... 428/414, 435, 436, 441; 349/60
See application file for complete search history.

(56) References Cited

U.S. PATENT DOCUMENTS

| 3,756,482 | A | * | 9/1973 | De Torre ......................... 225/2 |
| 5,853,828 | A | * | 12/1998 | Schimmelpenningh et al. ............................... 428/34 |
| 5,955,198 | A | * | 9/1999 | Hashimoto et al. .......... 428/414 |
| 6,504,713 | B1 | * | 1/2003 | Pandolfi .............. G02F 1/13338 345/87 |
| 7,106,409 | B2 | * | 9/2006 | Matsuoka ............. G02F 1/1339 349/190 |
| 2003/0103256 | A1 | | 6/2003 | Berneth et al. |
| 2006/0240198 | A1 | * | 10/2006 | Tanikawa et al. ........... 428/1.53 |
| 2009/0247237 | A1 | * | 10/2009 | Mittleman ............ H04M 1/026 455/567 |

FOREIGN PATENT DOCUMENTS

CN          1412610 A       4/2003
CN       201174007 Y       12/2008
(Continued)

OTHER PUBLICATIONS

"What is Caulk?", obtained Oct. 28, 2014, Diamond Media, Inc., http://www.ehow.com/about_5114127_caulk.html.*
(Continued)

*Primary Examiner* — Nicholas Kokkinos
(74) *Attorney, Agent, or Firm* — Cooper Legal Group, LLC

(57) ABSTRACT

The present invention can achieve the purpose of enhancing the strength and the anti-crack ability of a glass plate. The glass plate includes a transparent glass-based element and a high polymer plastic membrane. The high polymer plastic membrane is framed on at least one part of the peripheral side of the transparent glass-based element and performs a capillary action on at least one part in a liquid state and then to be combined tightly with the transparent glass-based element after being solidified.

18 Claims, 3 Drawing Sheets

(56) References Cited

FOREIGN PATENT DOCUMENTS

| | | |
|---|---|---|
| CN | 101688987 | 3/2010 |
| JP | H08500553 | 1/1995 |
| JP | 08211414 | 8/1998 |
| JP | H11171595 | 6/1999 |
| JP | 2005526296 | 1/2004 |
| JP | 2006251859 | 9/2006 |
| JP | 2008280215 | 11/2008 |
| JP | 200914841 | 1/2009 |
| WO | 0149631 | 12/2001 |
| WO | 2010135614 | 11/2010 |

OTHER PUBLICATIONS

"Epoxy Resins," obtained Oct. 28, 2014, NetComposites, http://www.netcomposites.com/guide/epoxy-resins/10.*

* cited by examiner

GLASS PLATE, METHOD FOR MANUFACTURING THE SAME, AND DISPLAY DEVICE, TOUCH SENSITIVE DISPLAY USING THE SAME

BACKGROUND OF THE INVENTION

1. Field of the Invention

The present invention relates to a glass plate with a strengthening structure and a method for manufacturing the same. The present invention also relates to a display device and a touch sensitive display that uses the disclosed glass plate.

2. Description of Related Art

Recently, liquid crystal displays (LCDs) and touch sensitive displays are becoming increasingly popular. In a design structure, a transparent glass substrate formed on the surface of the LCD or the touch sensitive display, is a protective cover for reducing the damage caused by touching or pressing. In addition, the touch sensitive display also has another transparent glass substrate with the touch sensitive function. Therefore, since protection of the glass is important, many manufacturers have focused on gradually developing the strengthening technology for the transparent glass substrate.

In terms of the manufacturing process of the transparent glass panel, a small transparent glass panel is usually cut from a larger transparent glass panel to comply with the product requirement of the LCD manufacturer or the touch sensitive display manufacturer. The wheel scribing and breaking technique, as well as the laser scribing and breaking technique, are the traditional direct cutting techniques. However, the cut edges of the small transparent glass substrates are usually formed with some defects, such as breaks and chippings. These defects would not only decrease the strength of the transparent glass substrate, but would also cause a serious problem later during the lamination process.

To solve the above-mentioned problem, a computer numerical control (CNC) manufacturing process has been introduced to avoid the defects caused by the direct cutting technique. The skilled person in the art could be aware that the CNC manufacturing process is still some kind of destructive cutting manufacturing process, and would also decrease the strength of the surface of the transparent glass substrate. Though, the damages caused by the CNC manufacturing process are less than those by the direct cutting technique. However, after the large-size transparent glass substrate passes through the CNC manufacturing process, the strength of the small-size transparent glass panels would be substantially decreased when entering the reliability tests such as, tests with high temperature, high moisture, and the alternation of high temperature and low temperature.

In addition, once the transparent glass panel has been fabricated into the electronic product (like the LCD or the touch sensitive display), the transparent glass panel can only rely on the connecting mechanical parts of the electronic product to prevent any damages caused by a collision. Thus, based on the requirements for enhancing the strength of the transparent glass substrate of the LCD or the touch sensitive display, it is necessary to improve on the development of glass strengthening.

SUMMARY OF THE INVENTION

In view of the aforementioned issues, an objective of the present invention is to make enhancements for the surrounding position of a glass-based element in accordance with the fragile characteristic of the glass-based element on the surrounding position, such as a manufactured glass plate can be framed with a plastic membrane on at least one part of the peripheral side for enhancing the strength and the anti-crack ability thereof.

One embodiment of the present invention provides a glass plate. The glass plate includes a transparent glass-based element and a high polymer plastic membrane. The high polymer plastic membrane is framed on at least one part of the peripheral side of the transparent glass-based element.

Another embodiment of the present invention provides a glass plate. The glass plate includes a transparent glass-based element and a high polymer plastic membrane. The high polymer plastic membrane is framed on at least one part of the peripheral side of the transparent glass-based element and performs a capillary action, in a liquid state, on at least one part. The high polymer plastic membrane will combine closely and securely with the transparent glass-based element after being solidified on the transparent glass-based element. The same process can be applied to a transparent glass-based element of any shape, e.g. square, triangle, circle, rectangular, or trapezoid, to strengthen it.

Another embodiment of the present invention provides a method for manufacturing a glass plate. The method comprises the steps of providing a transparent glass-based element, then framing a high polymer plastic membrane, while in a liquid state, on at least one part of the peripheral side of the transparent glass-based element, letting the high polymer perform a capillary action on at least one part, and solidifying the high polymer plastic membrane so that the high polymer plastic membrane binds closely and securely with the transparent glass-based element.

Another embodiment of the present invention provides a display device. The display device includes a display module and a glass plate. The glass plate is disposed on an upper surface of the display module, and further includes a transparent glass-based element and a high polymer plastic membrane. The transparent glass-based element is a cover glass. The high polymer plastic membrane, while in a liquid state, is framed on at least one part of the peripheral side of the cover glass to perform a capillary action on the at least one part to bind closely and securely with the cover glass after being solidified on the cover glass.

Another embodiment of the present invention provides a touch sensitive display. The touch sensitive display includes a display module and a glass plate. The glass plate is disposed on an upper surface of the display module and further includes a transparent glass-based element and a high polymer plastic membrane. The transparent glass-based element is a touch panel glass. The high polymer plastic membrane, while in a liquid state, is framed on at least one part of the peripheral side of the touch panel glass, to perform a capillary action on the at least one part to bind closely, securely with the touch panel glass after being solidified on the touch panel glass.

As to the effects provided by the present invention, the manufacturers do not need to change the materials of the transparent glass-based element, but to frame the high polymer plastic membrane on at least one part of the peripheral side of the transparent glass-based element, of any shape, and the high polymer plastic membrane can effectively repair the breaks and chippings caused by a cutting process on the transparent glass-based element. In addition, it can also enhance the glass plate's resisting ability when undergoing environment tests, such as crush, fall, and pressure.

The above description as well as the following description and the attached drawings are all provided to further illustrate techniques and means that the present invention takes for achieving the prescribed objectives as well as effects of the present invention.

DETAILED DESCRIPTION OF THE PREFERRED EMBODIMENTS

The present invention relates to a glass plate with strength enhancement, which is a transparent glass-based element framed by a high polymer plastic membrane for enhancing the strength and the anti-crack ability. The glass plate of the present invention is applied to the display device or the touch sensitive display of 3C electronic products such as, mobile communication devices, portable media players, global positioning systems, digital cameras, personal digital assistants, notebooks, and tablet PCs.

Figure 1A:
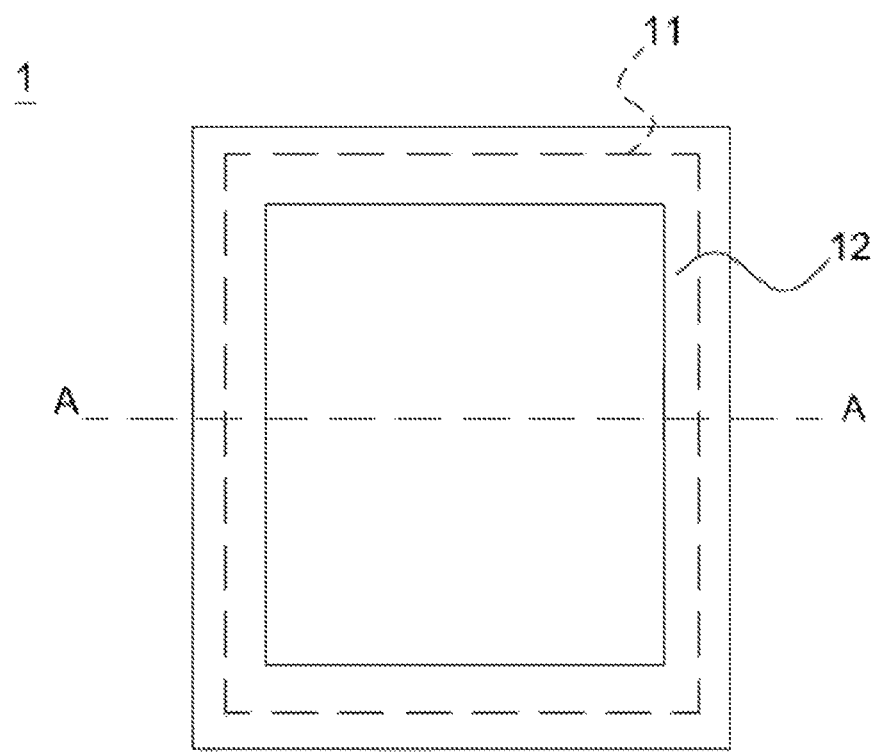
FIG. 1A is a schematic diagram of the top view of an embodiment of a glass plate according to the present invention.
Figure 1B:
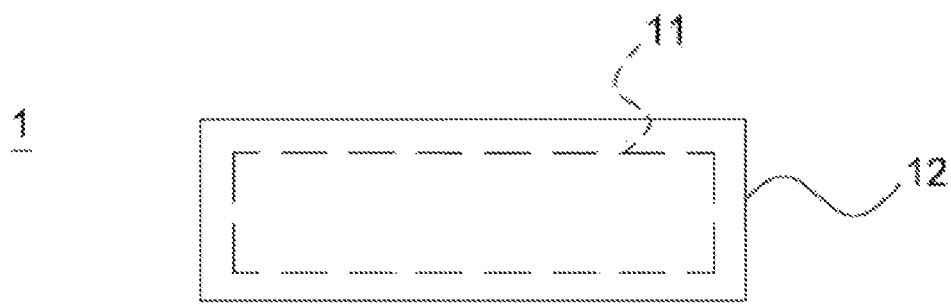
FIG. 1B is a schematic diagram of the side view of the embodiment of the glass plate according to the present invention.
Figure 1C:
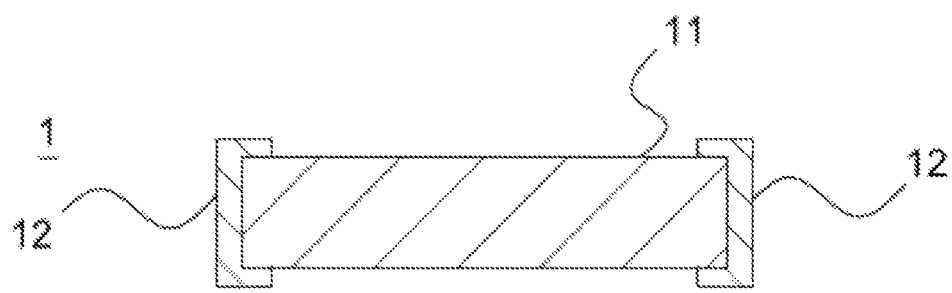
FIG. 1C is a schematic diagram of the cross-sectional view taken along plane A-A in FIG. 1A.

Reference is made to FIG. 1A, FIG. 1B, and FIG. 1C simultaneously, of which an embodiment of a glass plate according to the present invention is shown. As depicted, the present embodiment provides a glass plate 1 comprising a transparent glass-based element 11 and a high polymer plastic membrane 12. Herein, it is possible for the transparent glass-based element 11 to pass through one or more manufacturing processes in advance, such as cutting, edge polishing, etching, depositing, and surface treatment to form various shapes such as a square, triangle, circle, rectangular, trapezoid Furthermore, the transparent glass-based element 11 may also be a processed, multi-layer, transparent glass-based element 11 through a stacking process. In other words, the transparent glass-based element 11 can be formed as a transparent glass-based element 11, which passes through various manufacturing processes. For example, the transparent glass-based element 11 can be a touch panel glass, a cover glass, and the like.

The high polymer plastic membrane 12 is framed on at least one part of the peripheral side of the transparent glass-based element 11 in a liquid state. In the present and following embodiments, the transparent glass-based element 11 is designed to be of a rectangular shape, and the high polymer plastic membrane 12 is framed around the transparent glass-based element 11. In other words, the high polymer plastic membrane 12 is framed on all four peripheral sides of the transparent glass-based element 11.

In a practical design, it is possible for the material of the high polymer plastic membrane 12 to be a type of liquid adhesive to be cured, including, but not limited to, heat curing adhesive, light curing adhesive, and moisture curing adhesive. In detail, the material of the high polymer plastic membrane 12 comprises molecules that are large, multiples of units of low molecular weight. For example, it can be free radical epoxy resin, acryl resin, two-pack epoxy resin, dual cationic epoxy resin, epoxy acryl resin, phenol-formaldehyde resin, polyimide, or melamine-formaldehyde resin. This way, the high polymer plastic membrane 12, in a liquid state, can perform a capillary action on the transparent glass-based element 11, and it will combine closely and securely with the transparent glass-based element 11 after being solidified on the transparent glass-based element 11. Also, before the high polymer plastic membrane 12 is solidified, it can repair the breaks and the chippings formed on the transparent glass-based element 11, created during the cutting process.

In addition, the high polymer plastic membrane 12 can be applied to frame around the transparent glass-based element 11 by various framing techniques, including but not limited to, an injection molding process, a dispensing process, a spray-printing process, or a roller coating process. Furthermore, the actual covering range of the high polymer plastic membrane 12 is to satisfy a condition. The condition is that the high polymer plastic membrane 12 cannot interfere with the visible range of the glass plate 1 as the glass plate 1 is to be applied to the electronic product. No other limits exist regarding framing the high polymer plastic membrane 12 on at least one part of the transparent glass-based element 11.

Figure 2:
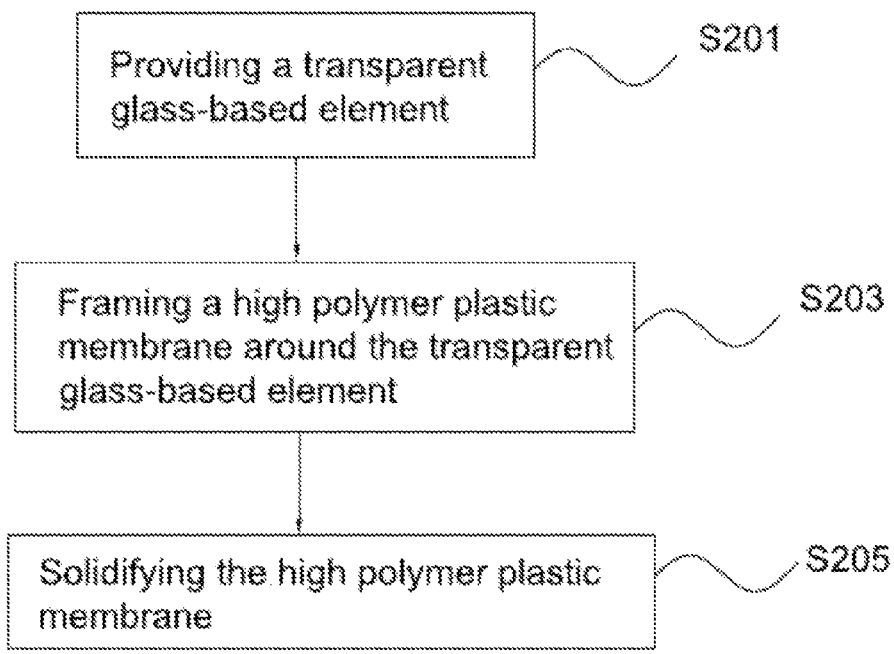
FIG. 2 is a flowchart of an embodiment of a method for manufacturing the glass plate according to the present invention.

To better illustrate the manufacturing process of the glass plate 1, reference is now made to FIG. 2 in accordance with FIG. 1A to FIG. 1C, wherein a flowchart of an embodiment of a method for manufacturing the glass plate according to the present invention is shown. As illustrated in FIG. 2, the present embodiment provides a method for manufacturing the glass plate 1, comprising the following steps: initially, providing the transparent glass-based element 11 (S201); next, framing the high polymer plastic membrane 12 around the transparent glass-based element 11 (S203), and the high polymer plastic membrane 12 can perform the capillary action on the transparent glass-based element 11 before the high polymer plastic membrane 12 is solidified. In other words, the high polymer plastic membrane 12 can infiltrate into the breaks and chippings of the transparent glass-based element 11 before the high polymer plastic membrane 12 is solidified.

Herein, according to the present embodiment, it is possible for the framing technique to adopt an injection molding process, a dispensing process, a spray-printing process, or a roller coating process to frame, using the high polymer plastic membrane 12. To the skilled person in the art, it can be understood that the different framing techniques can be operated with the respective specific procedures. For example, in the spray-printing process, it may be preceded with a covering step to cover the visible range of the transparent glass-based element 11 with a shelter before spray printing.

Finally, the high polymer plastic membrane 12 (S205) is solidified to ensure that the high polymer plastic membrane 12 can cover and stick on the surrounding positions of the transparent glass-based element 11 securely. In brief, the glass plate 1, according to the present embodiment, can repair the defects (such as breaks and chippings) caused by cutting through the capillarity, and the transparent glass-based element 11 does not deteriorate to form greater breaks or cracks. In addition, the solidified high polymer plastic membrane 12 can remedy the drawback of fragileness on the surrounding position of the transparent glass-based element effectively, and enhance the anti-crack ability.

Taking a practical design as an example, if the transparent glass-based element 11 of the present embodiment is a touch panel glass, the manufactured glass plate 1 would become a touch panel glass with a plastic frame.

Figure 3:
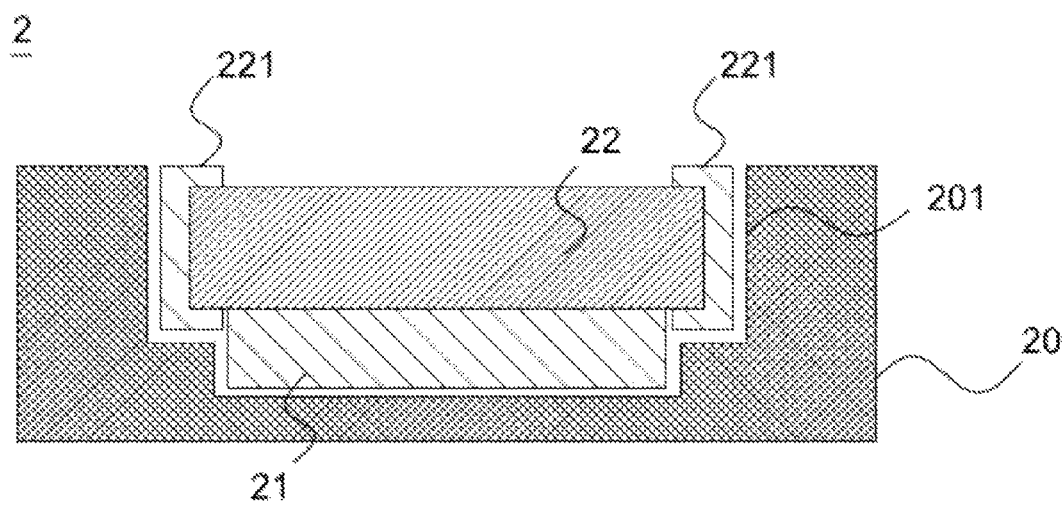
FIG. 3 is a cross-section schematic view of an embodiment of a display device according to the present invention.

In FIG. 3, a cross-section schematic view of an embodiment of a display device, according to the present invention, is shown. As depicted, the present embodiment discloses a display device 2, comprising a housing 20, a display module 21, and a cover glass 22 (such as mirror glass). The housing 20 has an accommodating fillister 201 for holding the display module 21 and the cover glass 22. Herein, the cover glass 22 is disposed and stuck on an upper surface of the display module 21 through an adhesive (not shown). In addition, it is possible for the display module 21 to adopt a liquid crystal display module (LCD module), a plasma display module, and a cathode ray tube display module (CRT module) for constructing different display devices 2, but without any limitation.

Further referring to FIG. 3, the present embodiment is directed to the cover glass 22 to enhance the strength, and hence, frame a high polymer plastic membrane 221 around the cover glass 22. Therefore, when the display device 2 has been fabricated, the cover glass 22 has the anti-crack ability in itself, as well as being able to reduce the dependence on the mechanical protection of the housing 20.

Figure 4:
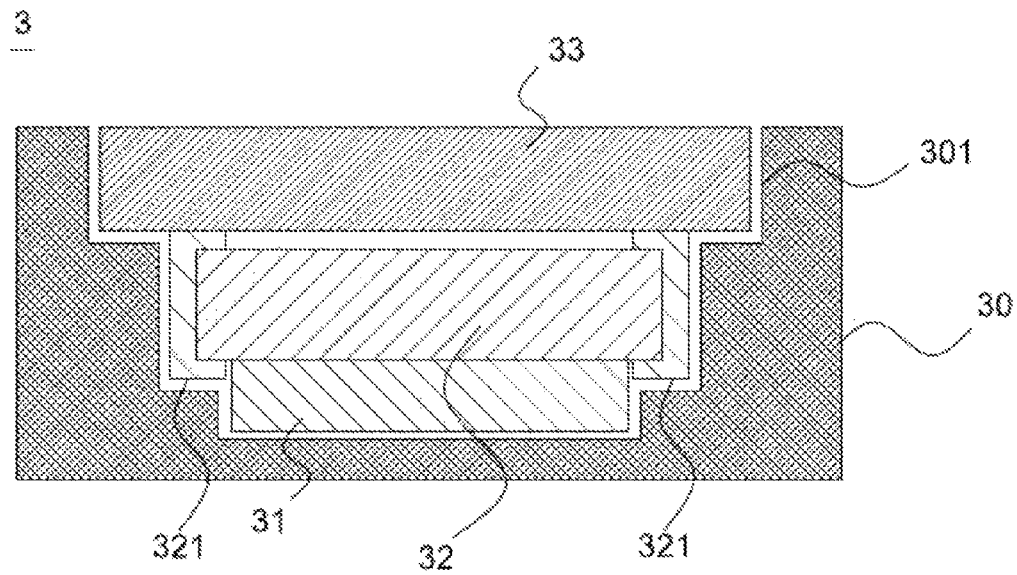
FIG. 4 is a cross-section schematic view of a first embodiment of a touch sensitive display according to the present invention.

FIG. 4 shows a cross-section schematic view of a first embodiment of a touch sensitive display device, according to the present invention. As depicted, the first embodiment discloses a touch sensitive display 3, comprising a housing 30, a display module 31, a touch panel glass 32, and a cover glass 33; wherein, the housing 30 has an accommodating fillister 301 for holding the display module 31, touch panel glass 32, and the cover glass 33 from the bottom-up. In addition, the touch panel glass 32 is disposed and stuck on an upper surface of the display module 31 through an adhesive (not shown), and the cover glass 33 is further disposed and stuck on an upper surface of the touch panel glass 32 through another adhesive (not shown).

As shown in FIG. 4, the first embodiment is directed to the touch panel glass 32 to enhance the strength, and hence, frame a high polymer plastic membrane 321 around the touch panel glass 32. Therefore, when the touch sensitive display 3 has been fabricated, the touch panel glass 32 has the anti-crack ability in itself, as well as being able to reduce the dependence on the mechanical protection of the housing 30.

Furthermore, in a practical design of the touch sensitive display 3, the first embodiment, can be directed to the cover glass 33 to enhance the strength. The cover glass 33 can be further framed with another high polymer plastic membrane (not shown) for enhancing the strength and the anti-crack ability.

Figure 5:
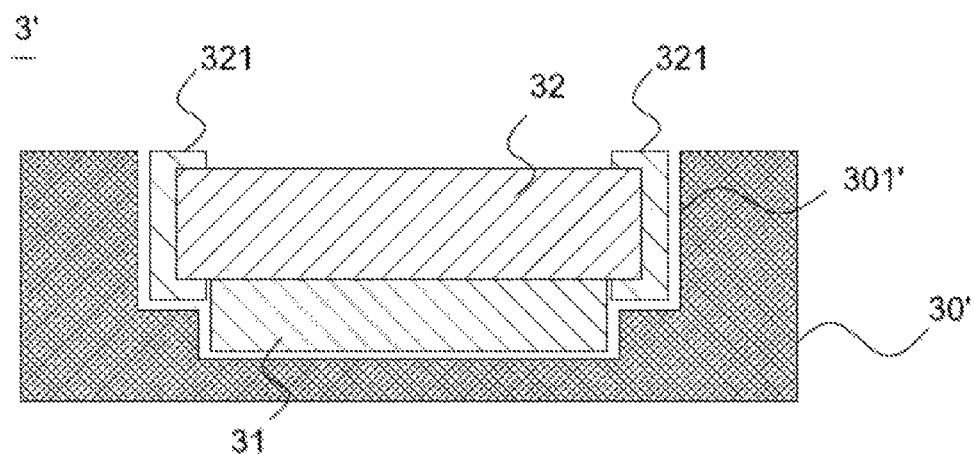
FIG. 5 is a cross-section schematic view of a second embodiment of the touch sensitive display according to the present invention.

FIG. 5 shows a cross-section schematic view of a second embodiment of the touch sensitive display according to the present invention. As depicted, the second embodiment discloses a touch sensitive display 3 which is similar to the first embodiment. The difference is that the touch sensitive display 3 of the second embodiment comprises a housing 30 with a fillister 301, a display module 31, and a touch panel glass 32. In addition, the touch panel glass 32 is designed as a supportive and protective glass of the touch sensitive device 3. Furthermore, the second embodiment is also directed to the touch panel glass 32 to enhance the strength, and the touch panel glass 32 is framed with the high polymer plastic membrane 321, i.e. together the whole glass plate. The whole glass plate can implement both functions of touch sense and cover protection simultaneously. Therefore, compared with the first embodiment, the second embodiment can save the cost of the cover glass 33.

Finally, to better illustrate that the glass plate of the present invention has greater strength than the general transparent glass-based element, some numerical values are listed in the Table 1 and Table 2 below, which show a first experiment data table and a second experiment data table showing, respectively, the tested strength of different types of the transparent glass-based element and tested strength after being cut.

Table 1 discloses the testing results of the Modulus of Rupture (MOR), which includes a general transparent glass-based element and a different type of transparent glass-based elements, separately framed with free radical epoxy resin, acryl resin, two-pack epoxy resin, and dual cationic epoxy resin.

TABLE 1

| Testing Sample | Modulus of Rupture (Unit: mpa) |
| --- | --- |
| General transparent glass-based element | 455.4 |
| Transparent glass-based element framed with free radical epoxy resin | 741.1 |
| Transparent glass-based element framed with acryl resin | 767.4 |
| Transparent glass-based element framed with two-pack epoxy resin | 798.2 |
| Transparent glass-based element framed with dual cationic epoxy resin | 820.5 |

Table 2 discloses the testing results of the MOR, which includes a transparent glass-based element cut by a direct cutting technique, a transparent glass-based element cut by a computer numerical control (CNC) manufacturing process, and a transparent glass-based element cut by the direct cutting technique and framed with epoxy acryl resin, according to the present invention.

TABLE 2

| Testing Sample | Modulus of Rupture (Unit: mpa) |
| --- | --- |
| Transparent glass-based element cut by a direct cutting technique | 365.7 |
| Transparent glass-based element cut by CNC manufacturing process | 332.6 |
| Transparent glass-based element cut by the direct cutting technique and framed around with epoxy acryl resin | 851.2 |

As shown in the experiment data in Table 1 and Table 2, the glass plate of the present invention, which is the transparent glass-based element framed with the high polymer plastic membrane, can effectively enhance the strength when being compared to the general transparent glass-based element.

In addition, the present invention does not limit the material of the high polymer plastic membrane. The solidifying conditions of different materials are not exactly the same. For example, free radical epoxy resin is one kind of light curing adhesive, and it can be solidified directly by ultraviolet light (UV light). Another material, two-pack epoxy resin, is one kind of heat curing adhesive, and its solidifying condition is to be coated completely within fifteen minutes, placed stably for twenty-four hours, and heated to become solidified under 80° C. for one hour. Thus, it can be seen that the solidifying conditions of such different high polymer plastic membranes are dependant on their own characteristics. Certainly, manufacturers can also modify the solidifying condition in accordance with different design requirements (such as stickiness, hardness, and shrink ratio.

In summary, with the design of framing the high polymer plastic membrane around the transparent glass-based element, the present invention does not need to change any material of the transparent glass-based element. This design can overcome the drawback of fragileness and enhance the strength of the glass-based element on the surrounding positions. The present invention is able to repair the breaks and chippings caused by cutting, and substantially enhances the ability to resist various environment tests such as crush, fall, and pressure tests.

While certain embodiments have been shown and described, various modifications and substitutions may be made thereto without departing from the spirit and scope of the invention. Accordingly, it is to be understood that the present invention has been described by way of illustration and not limitations.

What is claimed is:
1. A touch sensitive display, comprising:
a glass plate comprising:
a transparent touch panel glass having a first surface, a second surface and a plurality of peripheral sides, wherein the transparent touch panel glass has defects on the peripheral sides of the transparent touch panel glass; and
a solidified polymer plastic membrane configured to secure with the defects of the transparent touch panel glass so as to frame the peripheral sides of the transparent touch panel glass, wherein:
an area of the transparent touch panel glass that is not covered by the solidified polymer plastic membrane is defined as a visible area,
a first portion of the solidified polymer plastic membrane is in contact with a first portion of the first surface, and
a second portion of the solidified polymer plastic membrane is in contact with a second portion of the first surface; and
a display module disposed on the first surface, wherein:
the display module is disposed at the visible area, and
the display module is disposed between the first portion of the solidified polymer plastic membrane and the second portion of the solidified polymer plastic membrane.

2. The touch sensitive display according to claim 1, further comprising a cover glass disposed over the second surface of the transparent touch panel glass.

3. The touch sensitive display according to claim 2, wherein the cover glass is further framed with a second solidified polymer plastic membrane disposed on at least part of a peripheral side of the cover glass.

4. The touch sensitive display according to claim 2, wherein the solidified polymer plastic membrane has a third portion disposed on the second surface, and the cover glass is disposed on the third portion of the solidified polymer plastic membrane so that a gap is defined between the cover glass and the transparent touch panel glass.

5. The touch sensitive display according to claim 2, further comprising a housing accommodating the glass plate, the display module and the cover glass.

6. The touch sensitive display according to claim 1, wherein the solidified polymer plastic membrane is derived by curing a liquid-state high polymer.

7. The touch sensitive display according to claim 6, wherein the liquid-state high polymer is a heat curing adhesive, a light curing adhesive, or a moisture curing adhesive.

8. The touch sensitive display according to claim 1, further comprising a housing accommodating the glass plate and the display module.

9. The touch sensitive display according to claim 1, wherein the display module is attached to the first surface without contacting the solidified polymer plastic membrane.

10. The touch sensitive display according to claim 1, comprising a cover glass, wherein:
a third portion of the solidified polymer plastic membrane is in contact with a first portion of the second surface,
a fourth portion of the solidified polymer plastic membrane is in contact with a second portion of the second surface, and
the cover glass overlies the third portion of the solidified polymer plastic membrane, the fourth portion of the solidified polymer plastic membrane, and the visible area of the transparent touch panel glass.

11. The touch sensitive display according to claim 10, wherein a gap is defined by the third portion of the solidified polymer plastic membrane, the fourth portion of the solidified polymer plastic membrane, the cover glass, and the second surface of the transparent touch panel glass.

12. The touch sensitive display according to claim 10, wherein the cover glass is in contact with the third portion of the solidified polymer plastic membrane and the fourth portion of the solidified polymer plastic membrane.

13. A touch sensitive display, comprising:
a glass plate comprising:
a transparent touch panel glass having a first surface, a second surface and a plurality of peripheral sides, wherein the transparent touch panel glass has defects on the peripheral sides of the transparent touch panel glass; and
a solidified polymer plastic membrane configured to secure with the defects of the transparent touch panel glass so as to frame the peripheral sides of the transparent touch panel glass, wherein:
an area of the transparent touch panel glass that is not covered by the solidified polymer plastic membrane is defined as a visible area,
a first portion of the solidified polymer plastic membrane is in contact with a first portion of the second surface, and
a second portion of the solidified polymer plastic membrane is in contact with a second portion of the second surface;
a display module disposed on the first surface, wherein the display module is disposed at the visible area; and
a cover glass, wherein the cover glass overlies the first portion of the solidified polymer plastic membrane, the second portion of the solidified polymer plastic membrane, and the visible area of the transparent touch panel glass.

14. The touch sensitive display according to claim 13, wherein a gap is defined by the first portion of the solidified polymer plastic membrane, the second portion of the solidified polymer plastic membrane, the cover glass, and the second surface of the transparent touch panel glass.

15. The touch sensitive display according to claim 13, wherein the cover glass is in contact with the first portion of the solidified polymer plastic membrane and the second portion of the solidified polymer plastic membrane.

16. The touch sensitive display according to claim 13, further comprising a housing accommodating the glass plate, the display module and the cover glass.

17. The touch sensitive display according to claim 13, wherein the cover glass is further framed with a second solidified polymer plastic membrane disposed on at least part of a peripheral side of the cover glass.

18. The touch sensitive display according to claim 13, wherein the display module is attached to the first surface without contacting the solidified polymer plastic membrane.

* * * * *